United States Patent [19]

Chan et al.

[11] Patent Number: 4,968,404
[45] Date of Patent: Nov. 6, 1990

[54] PROCESS FOR DECOKING FLUID CATALYTIC CRACKING CATALYST

[75] Inventors: Henry C. Chan, Bellaire; Gary E. Collier, Houston, both of Tex.

[73] Assignee: Texaco Inc., White Plains, N.Y.

[21] Appl. No.: 354,585

[22] Filed: May 22, 1989

[51] Int. Cl.⁵ .............................................. C10G 11/00
[52] U.S. Cl. ..................... 208/113; 208/164; 502/41; 502/42; 502/43
[58] Field of Search ............... 208/113, 164; 502/41, 502/42, 43

[56] References Cited

U.S. PATENT DOCUMENTS

| | | | |
|---|---|---|---|
| 4,035,153 | 7/1977 | Bunn, Jr. et al. | 23/288 |
| 4,051,069 | 9/1977 | Bunn, Jr. et al. | 252/417 |
| 4,060,395 | 11/1977 | Custagnos, Jr. et al. | 23/288 |
| 4,062,759 | 12/1977 | Castagnos, Jr. et al. | 208/113 |
| 4,150,090 | 4/1979 | Murphy et al. | 422/144 |
| 4,180,454 | 12/1979 | Luchenbach | 502/42 |
| 4,223,843 | 9/1980 | Smith et al. | 239/558 |
| 4,304,659 | 12/1981 | Pratt et al. | 208/164 |
| 4,309,309 | 1/1982 | Blaxton, Jr. | 502/42 |
| 4,443,551 | 4/1984 | Lionetti et al. | 502/41 |

Primary Examiner—Chung K. Pak
Attorney, Agent, or Firm—Jack H. Park; Kenneth R. Priem; Richard A. Morgan

[57] ABSTRACT

In a fluid catalytic cracking process, coke is burned from spent catalyst at elevated temperature in a vertically arranged regenerator vessel. The regenerator vessel contains a lower, dense phase oxidation zone to which spent catalyst is introduced and an upper, dilute phase oxidation zone. Catalyst is fluidized and oxidized by means of air which is introduced in an amount of 5 vol % to 15 vol % to a lower air distributor at the bottom of the dense phase zone. Spent catalyst is discharged above the lower air distributor. The balance of the air is distributed in a horizontal plane in the dense phase above the catalyst discharge. As a result, a substantial proportion of the coke and carbon monoxide is burned in the dense phase zone at a lower temperature. A reduced amount of carbon monoxide is carried over to the dilute phase where higher temperature oxidation occurs.

4 Claims, 2 Drawing Sheets

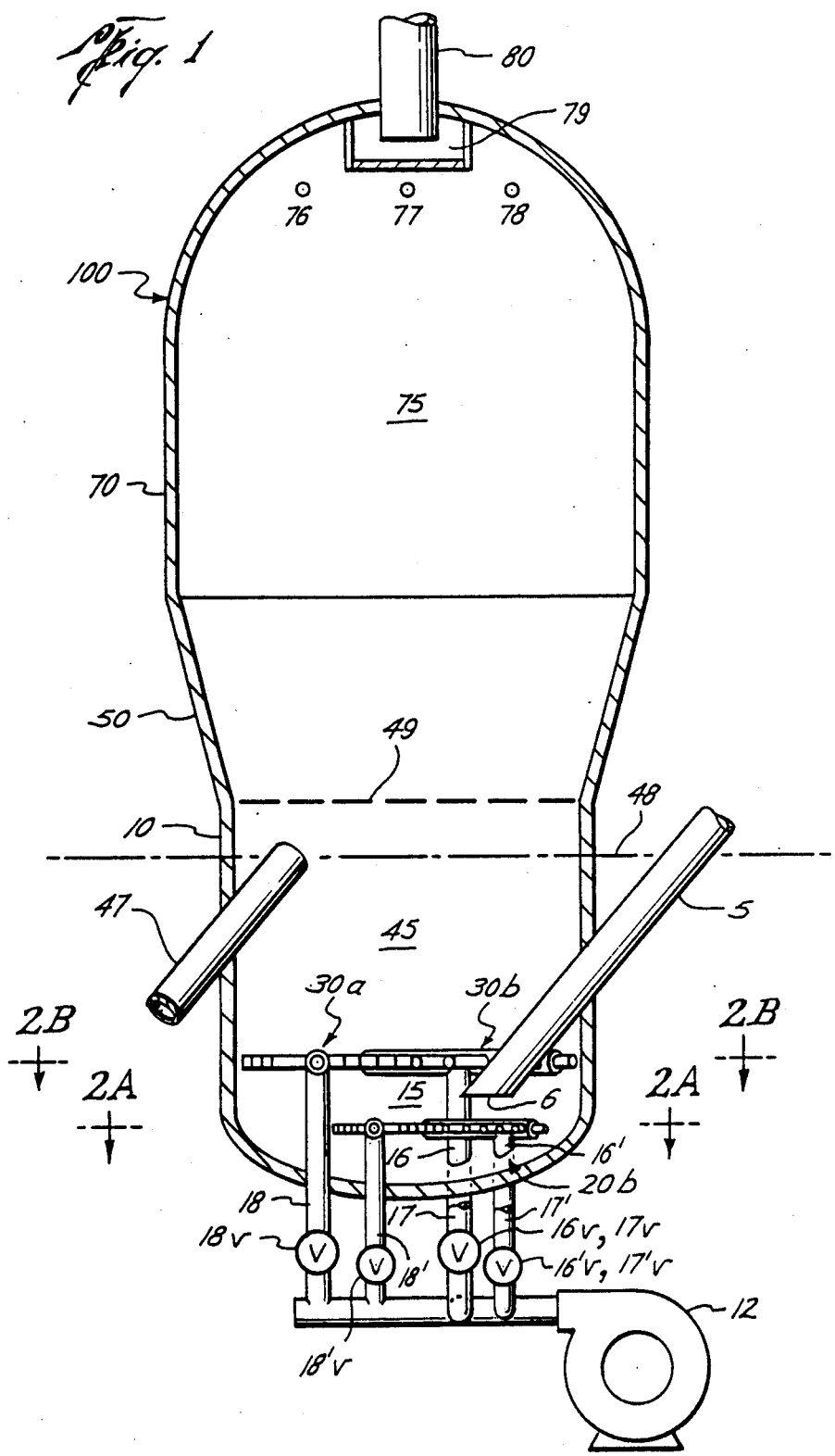

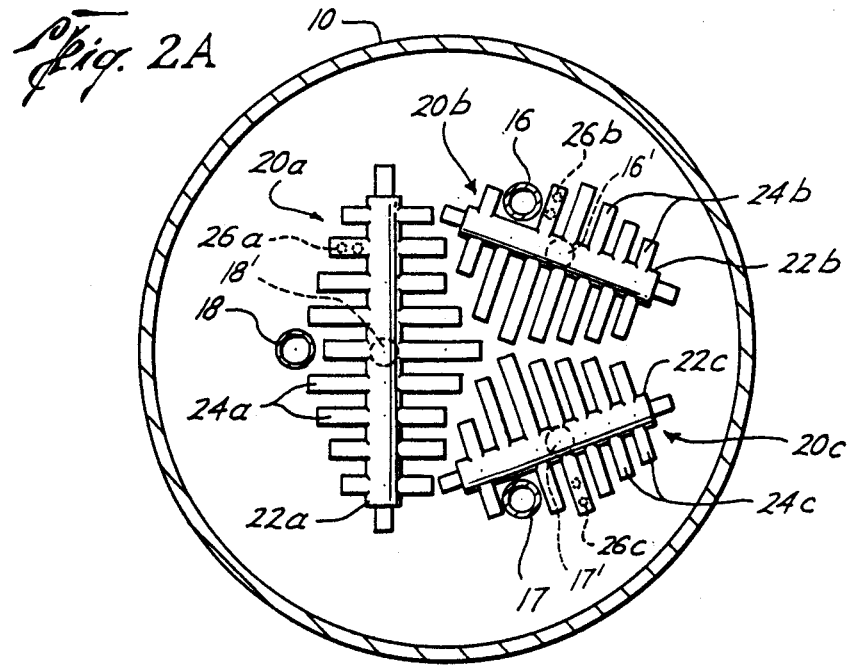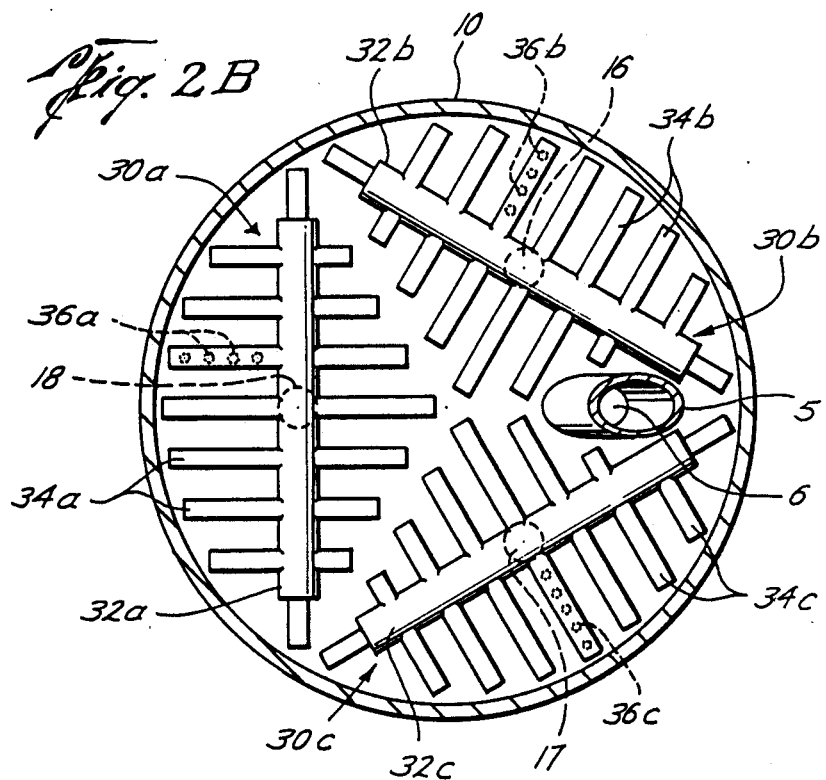

PROCESS FOR DECOKING FLUID CATALYTIC CRACKING CATALYST

BACKGROUND OF THE INVENTION

1. Field of The Invention

This invention relates to a fluid catalytic cracking process. The invention also relates to the regeneration of inactivated fluid catalytic cracking catalyst by the oxidation of coke deposited thereon.

2. Description of Related Methods In The Field

The catalytic cracking of hydrocarbon feedstocks is well known. U.S. Pat. No. 4,304,659 to R. E. Pratt et al. incorporated herein by reference teaches a process wherein regenerated catalyst is fluidized in the lower portion of a riser transport line reactor and mixed with a hydrocarbon charge stock. Hydrocarbon conversion products including a fuel boiling range product, gas and coked catalyst are discharged from the upper end of the riser reactor into a reaction vessel. In the reaction vessel, coked catalyst is separated in a cyclone separator and passed to a stripping section where hydrocarbon vapors are steam stripped from the catalyst. The resulting coke contaminated catalyst, termed spent catalyst is collected in a spent catalyst standpipe and passed to a vertically arranged cylindrical regenerator vessel. The spent catalyst is passed substantially vertically downwardly by means of a catalyst entry nozzle into a fluidized dense phase catalyst bed. The fluidization is maintained by upwardly flowing oxygen containing regeneration gas introduced by a gas distributor into the lower portion of the dense phase catalyst bed contained in the bottom of the regenerator vessel. Regeneration gas is supplied in excess of that required for complete oxidation of coke as indicated by the analysis of oxygen in flue gas. Above the dense phase catalyst bed is a dilute phase bed wherein residual carbon is oxidized at a temperature higher than in the dense phase bed. Reactivated catalyst, substantially reduced in coke (0.15 wt% or less) is passed vertically upwardly by the fluidizing regeneration gas to an upper portion of the dilute phase bed and into a regenerated catalyst standpipe where it is collected for reuse in the riser reactor.

U.S. Pat. No. 4,443,551 to T. A. Lionetti et al. incorporated herein by reference teaches a regeneration gas distributor in the catalyst regenerator of a fluid catalytic cracking process. The distributor comprises a pair of horizontally disposed air rings. The lower air ring is supported adjacent the bottom of the regenerator vessel by a plurality of struts. High velocity air from a high pressure air manifold is passed through the air ring and ejected downwardly, thereby maintaining fluidization in the catalyst bed. An upper and outer air distribution ring is similarly positioned in the vessel. It is understood from this teaching that nozzle angle may vary depending on the particular air pressure and geometry of the vessel.

U.S. Pat. No. 4,150,090 to J. R. Murphy teaches an air distributor in a spent catalyst regenerator. The patent teaches introducing spent catalyst to a dense phase fluid bed. The catalyst is distributed steadily and evenly over the top of the catalyst bed. Air is distributed in the bed by a plurality of horizontally extending pipes on which are mounted branch pipes. Nozzles which pass air into the catalyst bed are mounted on the branch pipes. The distributor is designed to deliver air evenly into the fluid bed for migration upward to burn the coke evenly within the bed.

Fluidized cracking catalyst regeneration process and apparatus are described in U.S. Pat. Nos. 4,035,153 and 4,051,069 both to D. P. Bunn, Jr. et al. and U.S. Pat. Nos. 4,060,395 and 4,062,759 both to L. F. Castagnos, Jr. et al. U.S. Pat. No. 4,223,843 to R. S. Smith et al. teaches air distribution apparatus nozzle design.

BRIEF DESCRIPTION OF THE DRAWINGS

FIG. 1 is a side view in section of a regenerator in a fluid catalytic cracking process having upper and lower air distributors.

FIG. 2a is a sectional view along line 2a—2a of FIG. 1 disclosing details of a lower air distributor. FIG. 2b is a sectional view along line 2b—2b of FIG. 1 disclosing details of an upper air distributor.

DETAILED DESCRIPTION OF THE DRAWINGS

FIG. 1 is a schematic representation of a fluidized catalyst regenerator for carrying out the process of the invention. It is understood that the drawing is only in such detail as required for a clear understanding of the invention and that various elements commonly employed in a commercial catalyst regeneration apparatus such as valves, pipes and instrumentation which are not necessary for a complete description of the invention have been omitted for the sake of clarity. In this regard U.S. Pat. Nos. 4,035,153 and 4,051,069 to Bunn, Jr. et al. both incorporated herein by reference provide a more detailed description of the useful art of fluidized catalyst regeneration.

Spent fluid catalytic cracking catalyst deactivated by coke deposition is discharged from a reaction vessel (not shown) and continuously transferred via spent catalyst standpipe conduit 5 into regeneration vessel 100. Regeneration vessel 100 is an upright cylindrical vessel comprising an upper vessel section 70 closed at the top and of larger diameter and a lower vessel section 10 closed at the bottom and of lesser diameter wherein said upper vessel section 70 and lower vessel section 10 are joined by a frustro conic transition section 50 open at both ends. The bottom end of transition section 50 is in axial alignment and in communication with the open top of lower vessel section 10. The top end of transition section 50 is in axial alignment and in communication with the open bottom of upper vessel section 70. Unimpeded flow of catalyst, regeneration gas and gaseous regeneration products is permitted between lower vessel section 10 and upper vessel section 70.

The lower vessel section 10 contains and is substantially filled by a dense catalyst phase regeneration zone 45. The volume of the dense phase 45 may coincidentally be equal to the contained volume of the lower vessel section 10 or be greater or lesser depending on selected operating conditions and the extent of decoking required. The dense phase zone 45 is identified at its upper limit by level 49. The dense phase zone 45 has a superficial vapor velocity of 2 to 6 ft/sec. and a residence time of 3 to 10 minutes which produces a catalyst density of 20 to 40 lb/ft$^3$.

Above level 49 is the dilute catalyst phase regeneration zone 75 which is contained by the remaining volume of regeneration vessel 100. This dilute phase zone 75 has a typical superficial vapor velocity of 0.5 to 4 ft/sec. and a residence time of 3 to 20 minutes which produces a catalyst density of 0.1 to 2.0 lb/ft$^3$.

Bulk average dense catalyst phase temperature ranges from 1250° F. to 1400° F. Dilute phase temperature ranges from 1250° F. to 1500° F. Although the range of operating temperatures of the two catalyst phases is substantially coincident, at any operating point the dilute phase temperature is higher than the dense phase temperature, typically 0° F. to 100° F. higher.

High temperature zones in the dense catalyst phase regeneration zone known as hot spots are caused by poor catalyst distribution. These localized hot spots are estimated to reach 2000° F. while the bulk average temperature is 1350° F. Catalyst deactivation is attributed to this high temperature exposure. Deactivation is attenuated by catalyst dense phase distribution which equilibrates temperature in the horizontal plane, eliminating high temperature zone hot spots. An increase in bulk catalyst activity is thereby achieved; measured e.g. by ASTM Micro Activity Test D-3907. It is known in the art that increased catalyst activity can be utilized in a number of ways such as to increase conversion to liquid fuel or to lower riser reactor temperature at constant conversion.

Catalyst, substantially reduced in coke passes from the dense catalyst phase regeneration zone 45 via regenerated catalyst conduit 47, out of regeneration vessel 100 and to regenerated catalyst standpipe (not shown) for reuse in the fluid catalytic cracking reaction zone.

Excess regeneration air and gaseous regeneration products, termed flue gas, pass to plenum chamber 79 and out of regeneration vessel 100 via vent conduit 80. Catalyst and catalyst fines are returned from plenum chamber 79 to dense catalyst phase 45 via cyclone separators (not shown).

Air inlet headers 16, 17, 18 and 16', 17', 18' enter regeneration vessel 100 through the bottom elliptical head of lower vessel section 10. Air inlet headers 16, 17, 18 and 16', 17', 18' are in direct fluid communication with an air blower 12. Air inlet headers 16', 17', 18' supply the air required for regeneration to lower horizontally positioned distributors 20a, 20b, 20c. Air inlet headers 16, 17, 18 supply the air required for regeneration to upper horizontally positioned air distributors 30a, 30b, 30c. Air flow rate in headers 16, 17, 18 is regulated by means of corresponding air regulation valves 16v, 17v, 18v. Air flow rate in headers 16', 17', 18' is regulated by means of corresponding air regulation valves 16'v, 17'v, 18'v. In actual practice, air is regulated to give a constant after burn temperature across a horizontal plane adjacent the plenum chamber 79, measured by a series of thermocouples 76, 77, 78.

Spent fluid catalytic cracking catalyst is passed via spent catalyst standpipe conduit 5 via nozzle 6 into a catalyst discharge zone 15 which, given the vertical orientation of regeneration vessel 100, is a catalyst discharge level. It has been found that positioning nozzle 6 vertically equidistance between lower air distributors 20a, 20b, 20c and upper air distributors 30a, 30b, 30c results in a good catalyst distribution across the entire horizontal cross-sectional area in a horizontal plane 48 of lower vessel section 10 and provides an essentially uniform horizontal distribution of catalyst in the discharge zone even though nozzle 6 is off the center line of lower regenerator vessel section 10.

The process of the invention is dependent on the regeneration gas distributor configuration only in so far as both a lower and an upper horizontally extending distributor are required so as to promote relatively even distribution of regeneration gas in the horizontal plane. Lower and upper distributors may be of a configuration detailed in U.S. Pat. No. 4,443,551 to Lionetti et al. which teaches a lower and an upper air ring. The instant invention is also readily applicable to a configuration of horizontally branched pipes such as that described in U.S. Pat. No. 4,150,090 to Murphy et al. which do not appear geometrically compatible with a configuration of both lower and upper air distributors with a catalyst discharge zone between the two distributors.

Reference is made to FIG. 2a which is sectional view 2a—2a of FIG. 1 and to FIG. 2b which is sectional view 2b—2b of FIG. 1. Lower air distributors 20a, 20b, 20c are detailed in FIG. 2a. Upper air distributors 30a, 30b, 30c are detailed in FIG. 2b.

In the sectional view 2a—2a, three lower air distributors 20a, 20b and 20c are shown. Likewise in section view 2b—2b, three upper air distributors 30a, 30b and 30c are shown. Each of the air inlet headers 16', 17', 18' is connected to a horizontally extending pipe 22a, 22b, 22c. Each of the air inlet headers 16, 17, 18 is connected to a horizontally extending pipe 32a, 32b, 32c. A plurality of horizontally extending branch pipes 24a, 24b, 24c and 34a, 34b, 34c are mounted on and extend from pipes 22a, 22b, 22c and 32a, 32b, 32c. These horizontally extending branch pipes contain nozzles 26a, 26b, 26c and 36a, 36b, 36c for passing air into the dense phase bed. In this representation the nozzles are ports of diameter calculated to achieve penetration and fluidization of the catalyst bed. Nozzles may be of a more complex design, such as an elongated tube of length and internal configuration to prevent catalyst ingress such as taught in U.S. Pat. No. 4,223,843 to R. S. Smith et al. incorporated herein by reference.

Air blower 12 is in fluid communication with air inlet headers 16', 17', 18', and 16, 17, 18 which are in fluid communication with pipes 22a, 22b, 22c and 32a, 32b, 32c. Pipes are in fluid communication with branches and branches with nozzles. The combination describes six independent air distributors 20a, 20b, 20c and 30a, 30b, 30c.

SUMMARY OF THE INVENTION

The invention is an improvement in a fluidized catalytic cracking (FCC) process wherein a charge stock is catalytically cracked at catalytic reaction conditions in a riser reaction zone and as a result coke is deposited on the catalyst. The catalyst is thereby inactivated or spent. Spent catalyst is regenerated by oxidizing the coke with supplied air at elevated temperatures and as a result the coke is removed. Regeneration is carried out in a vertically arranged regenerator vessel containing a dense phase fluidized catalyst oxidation zone immediately below a dilute phase fluidized catalyst oxidation zone. The dense phase zone comprises an upper portion, a lower portion with an intermediate portion between the two.

In the improvement, spent catalyst is passed to the dense phase oxidation zone. About 5 vol% to 15 vol% of supplied air is distributed into the lower portion of the dense phase oxidation zone. The balance of supplied air is distributed into the intermediate portion of the dense phase oxidation zone above the lower portion. As a result, catalyst is uniformly distributed and mixed in a horizontal plane in the dense phase oxidation zone. The detrimental effect of non uniform distribution and mixing, such as local high temperature zones, is thereby attenuated.

DETAILED DESCRIPTION OF THE INVENTION

According to the process of this invention, a fluidizable catalytic cracking catalyst which has been partially deactivated by the deposition of carbonaceous deposits upon the surface thereof; referred to as coke-contaminated catalyst, in a fluidized catalytic cracking process is introduced into a fluidized dense catalyst phase of a regeneration zone wherein it is contacted with an oxygen-containing regeneration gas for the purpose of burning the carbonaceous deposits from the catalyst to restore its activity. The regeneration zone generally comprises a regeneration vessel in which there is a fluidized dense catalyst phase in the lower portion thereof and a dilute catalyst phase in the upper portion thereof. The oxygen-containing regeneration gas is introduced into the lower portion of the regeneration zone to maintain the catalyst in a fluidized dense catalyst state. A flue gas is recovered from the top of the regeneration zone comprising carbon monoxide and other by-products of the combustion of the coke deposits contained on the coke-contaminated catalyst.

The fluidized dense catalyst phase is generally maintained at a density of from about 20 to about 40 lb/ft$^3$ by the upward flow of the oxygen-containing regeneration gas, which is introduced at a lower portion in the regeneration zone. The catalyst in the lower portion of the regeneration zone is maintained in a fluidized dense catalyst phase in order to obtain good heat transfer throughout the bed and to avoid localized high temperature hot spots which are known to adversely affect the catalyst. In order to maintain the catalyst in a fluidized state, a vapor velocity of the regeneration gas of from about 0.1 to about 6.0 ft/sec is maintained. The regeneration vessel is generally sized to provide a specific vapor velocity within the aforementioned ranged when operating with the desired residence time for the catalyst in the regeneration zone and with the required amount of oxygen-containing regeneration gas to effect the combustion of the coke from the catalyst in the reaction zone. Additionally, it is possible to control the specific vapor velocity within the desired range by employing an operating pressure within the regeneration zone within the range of from about 1 to 5 atm, preferably 2 to 4 atm.

In order to operate the regenerator such that the flue gas contains carbon monoxide in an amount of about 500 ppm or less and does not require additional treatment prior to discharge into the atmosphere, it is necessary to maintain the fluidized dense catalyst phase of the regeneration zone at a temperature in the range of from about 1250° F. to about 1400° F. At a fluidized dense catalyst phase temperature in the range of from about 1350° F. to about 1400° F., and sufficient volume of fluidized dense catalyst phase to provide a catalyst residence time within the fluidized dense catalyst phase of from about 3 to about 10 minutes, coke is burned from the partially deactivated coke-contaminated catalyst in a manner such that all of the carbon monoxide formed in the combustion process is converted to carbon dioxide in the fluidized dense catalyst phase. Therefore, operating the regenerator fluidized dense catalyst phase within these temperatures controls after burning in the dilute catalyst phase. By controlled after burn is meant effecting combustion of the coke from the partially spent catalyst in the fluidized dense phase of the regeneration zone such that the combustion of carbon monoxide to carbon dioxide is initiated in the fluidized dense catalyst phase and is completed in the dilute catalyst phase with only a moderate increase in temperature, such that the temperature in the dilute catalyst phase of the regeneration zone does not exceed about 1455° F.

Catalyst distribution is substantially improved by distributing 5 vol% to 15 vol% of supplied air to the bottom of the dense catalyst phase. The air to the bottom distributor serves three functions. The first and most important is to distribute the spent catalyst evenly over the lowest horizontal cross-section of the dense catalyst phase. The second is to fluidize catalyst at the bottom of the dense catalyst phase. The third is to initiate oxidation of coke on catalyst. It has been found that a relatively even and complete coke burn can be achieved as the catalyst travels vertically upward from the bottom to the top of the dense catalyst phase. This is accomplished by initiating combustion with a relatively small amount of air. In contrast, initiation with large amounts of air causes the coke rich catalyst to burn rapidly with incomplete conversion of carbon dioxide to carbon monoxide. An incomplete burn in the dense phase forces burn to continue in the dilute phase at higher temperatures, for example at 1500° F. or higher. This phenomenon is referred to as uncontrolled after burn.

When air to the lower air distributor is limited to 5 vol% to 15 vol%, preferably 8 vol% to 12 vol%, oxidation is initiated and upward air velocity for fluidization reduced to 0.1 ft/sec to 2 ft/sec. At this transport rate, the oxidation rate is, with good catalyst distribution, equilibrated in a horizontal plane across the dense catalyst phase. Hot spots caused by maldistribution are reduced.

The balance of regeneration air (85 vol% to 95 vol%) is distributed evenly across a horizontal plane in the dense catalyst phase above the catalyst distribution level. This second air distribution provides for full combustion of coke and for fluidization. Accordingly, complete combustion of coke can be accomplished above the second, upper air distributor in the dense catalyst phase and after burn in the dilute catalyst phase controlled and reduced.

The amount of oxygen-containing regeneration gas necessary in the practice of the process of this invention will depend upon the amount of coke contamination on the catalyst being introduced into the regeneration zone. Generally, oxygen is provided in an amount sufficient to effect the substantially complete combustion of coke from the catalyst and to provide an oxygen concentration in the flue gas from the regeneration zone of from about 0.5 to about 10 mol%, and preferably from about 2 to about 5 mol%.

The oxygen-containing regeneration gas which may be employed in practicing the process of this invention includes gases which contain molecular oxygen in admixture with other inert gases. Air is a particularly suitable regeneration gas. Additional gases which may be employed include oxygen in combination with carbon dioxide and/or other inert gases. Additionally, if desirable, steam may be added as a part of the regeneration gas mixture. It is understood that for purposes of this invention the additional gases mentioned herein are the functional equivalent of air.

This invention is shown by way of Example.

EXAMPLE

A vertically arranged catalyst regenerator for a fluid catalytic cracking process comprises a lower cylindrical section and an upper cylindrical as shown in U.S. Pat. No. 4,035,153 to Bunn, Jr. et al. incorporated herein by reference.

The lower cylindrical section has a 32.5 ft diameter, a 24.4 ft height and is closed at the bottom with an elliptical head. The upper cylindrical section has a 43 ft diameter, a 15 ft height and is closed at the top with an hemispherical head.

Lower air distributor is positioned 4.5 ft above the lowest point of the lower elliptical head. Upper air distributor is positioned 5.5 ft above the lower air distributors. The upper and lower air distributors are configured according to FIG. 2A and FIG. 2B. In brief each air distributor comprises three horizontally extending main pipes in fluid communication with an air supply. Orifice flow meters and manually operated butterfly valves control air flow to each main pipe. Sixteen branch pipes extend horizontally from the main pipes. Tubular nozzles mounted 45° from the vertical are mounted on the branch pipes to pass air downwardly and laterally.

A straight spent catalyst standpipe 44 inches in diameter is positioned at an angle of 50° from the horizontal to deposit spent catalyst 2.9 ft above the lower air ring and 5 ft from the center line of the vessel.

The lower cylindrical vessel section contains the dense phase catalyst zone. The upper cylindrical vessel section contains the dilute phase catalyst zone.

EXAMPLE 1 (Comparative)

Air flow to the upper and lower air distributor is proportional to the nozzle flow area. The air flow to each of six main pipes is adjusted to balance and minimize after burn temperature in the dilute phase measured by thermocouples 76, 77, 78.

EXAMPLE 2

Air distribution is readjusted with 10% of supplied air in the lower air distributor and 90% in the upper air distributor. Air flow to each main pipe is again adjusted to balance and minimize after burn.

Typical operating conditions for regeneration are as follows:

Air Rates
  Upper air distributor (30a, 30b, 30c)=726,900 lb/hr.
  Lower air distributor - adjusted to give a constant after burn temperature across dilute phase.
    Distributor 20a=42,480 lb/hr.
    Distributor 20b=28,320 lb/hr.
    Distributor 20c=28,320 lb/hr.
Air Temperature=446° F.
Air Supply Pressure
  at upper air distributor nozzles=4.2 atm.
  at lower air distributor nozzles=4.3 atm.
Regenerator Pressure=3.9 atm.
Regenerator Bed Density
  above upper air distributor=24 lb/ft$^3$
  between lower air distributor=40 lb/ft$^3$ and upper air distributor
Catalyst Circulation Rate=134,000 lb/min.

It was calculated that with this readjustment, after burn in the dilute phase will drop 50° F. As a result, catalyst microactivity increases by 1 to 3 MAT numbers (ASTM D-3907 Micro Activity Test). It is found with the increased catalyst activity that the dense phase bed level can be lowered 8 ft, reducing catalyst inventory by 200,000 lb with the same conversion of feedstock to gasoline.

EXAMPLE 3

A 1/10 scale Plexiglass model of a catalyst regenerator was constructed with dimensions according to the Figure. Dyed catalyst was injected with spent catalyst into the model to simulate the catalyst distribution profile in a plant scale regenerator. Air rate to the lower distributors 20a, 20b, 20c was varied. Air rate to the upper distributors was maintained constant.

Spent catalyst horizontal distribution was most uniform with 10 vol% of total air in the lower distributors and 90 vol% in the upper air distributors.

Distribution of the dyed catalyst in the horizontal plane at the spent catalyst discharge level was most influenced by proportional air rate to lower distributors 20a, 20b, and 20c. Catalyst distribution was most uniform in the horizontal plane between the upper and lower distributors at the proportionate ratios shown in Example 2. When air was preferentially added to one of the three air distributors 20a, 20b, or 20c, the dyed catalyst flowed toward that distributor in the horizontal plane.

Catalyst fluidized with as little as 1 vol% of total air in the lower distributors, but fluidization was much better above 5 vol%. Catalyst fluidization was satisfactory with air to any two of the three lower distributors shut off, but would not fluidize well with air to all lower distributors shut off.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

What is claimed is:

1. In a fluidized catalytic cracking process wherein a coke contaminated, spent cracking catalyst is regenerated by oxidation of coke therefrom with oxygen containing regeneration gas at elevated temperatures in a fluidized catalyst dense phase oxidation zone and a dilute phase oxidation zone, both zones contained in a vertically arranged regenerator vessel, the improvement which comprises:
   passing said spent catalyst to a catalyst discharge level within said dense phase oxidation zone,
   distributing about 5 vol% to 15 vol% of the regeneration gas into the dense phase oxidation zone below said catalyst discharge level thereby initiating oxidation of said coke,
   distributing the balance of the regeneration gas into said dense phase oxidation zone above said catalyst discharge level, thereby continuing the oxidation of said coke and removing a substantial portion thereof within said dense phase oxidation zone.

2. An improved method of removing carbonaceous matter from fluidized cracking catalyst, with oxygen containing regeneration gas at elevated temperatures in a catalyst regenerator comprising:
   a vertically elongated vessel containing a fluidized catalyst dense phase oxidation zone,
   means for passing catalyst to a catalyst discharge level in the dense phase oxidation zone,
   regeneration gas supply means extending into the vessel for supplying regeneration gas to regeneration gas distribution means positioned within said dense phase oxidation zone, said regeneration gas distribution means comprising a horizontally extending lower distributor positioned below said catalyst discharge level adjacent the lower end of the dense phase oxidation zone in fluid communication with regeneration gas supply means for receiving regeneration gas therefrom and nozzles for passing regeneration gas into said dense phase oxidation zone, and a horizontally extending upper distributor positioned above said catalyst discharge level, in fluid communication with regeneration gas supply means for receiving regeneration gas therefrom and nozzles for passing and directing regeneration gas downward into said dense phase oxidation zone, the improvement comprising:

supplying 5 vol% to 15 vol% of the regeneration gas to the lower distributor, supplying the balance of the regeneration gas to the upper distributor, thereby removing carbonaceous matter from catalyst at elevated temperatures, uniform in a horizontal plane in said dense phase oxidation zone.

3. The improved method of claim 2 wherein the lower distributor and upper distributor each comprise a plurality of horizontally extending pipes in fluid communication with regeneration gas supply means for receiving regeneration gas therefrom; and a plurality of branch pipes mounted with each of said branch pipes for receiving regeneration gas therefrom and passing the regeneration gas into the dense phase oxidation zone through said nozzles mounted on the branch pipes.

4. In a fluidized catalytic cracking process wherein a hydrocarbon charge stock is cracked in a reaction zone in the presence of hot, regenerated cracking catalyst, for conversion of the hydrocarbon charge stock into a lower boiling hydrocarbon product, wherein catalyst, spent by the accumulation of coke thereon is separated from the hydrocarbon product and passed to a catalyst discharge zone in a dense phase regeneration zone wherein the spent catalyst is regenerated in said dense phase regeneration zone, by burning coke therefrom with supplied regeneration gas at a temperature of about 1250° F. to 1400° F. wherein catalyst is passed from said dense phase regeneration zone vertically upward to a dilute phase regeneration zone wherein residual accumulated coke is burned at a temperature of about 1250° F. to 1500° F., the improvement comprising:

a. distributing 5 vol% to 15 vol% of said supplied regeneration gas in a lower portion of said dense phase regeneration zone below said catalyst discharge zone, and b. distributing the balance of supplied regeneration gas in said dense phase regeneration zone above said catalyst discharge zone, thereby moderating temperature distribution in the horizontal plane in said dense phase regeneration zone.

* * * * *